Patented Mar. 7, 1944

2,343,436

UNITED STATES PATENT OFFICE 2,343,436

FILTER

Donald H. Wells, Maplewood, N. J., and Melvin De Groote, University City, Mo., assignors to Purolator Products, Inc., Newark, N. J., a corporation of Delaware No Drawing. Application February 28, 1941, Serial No. 381,127

21 Claims. (Cl. 252—326)

This invention relates to filtration and filters therefor and relates more particularly to filtration of lubricating oil of internal combustion engines for the removal of solids therefrom.

The lubricating oil of an internal combustion engine, particularly a Diesel type engine, contains minute solids which filtering media, such as cloth, paper, cotton linters, wood pulp and the like, require considerable time to remove. The dirt removal rate of such filtering media depends upon a number of different conditions such as, in depth type filters, the method of assembling the medium, the density of the packing of the medium, the distribution of the oil passing therethrough, temperature pressure and a number of other variables. In filters of the extended area type, the amount of surface area, temperature, pressure, viscosity of the oil and other factors affect the dirt removal rate.

An object of this invention is to increase sharply the dirt removal rate of filtering media of the types above mentioned.

We have found that in filtering lubricating oils of internal combustion engines the dirt removal rate of filtering media may be sharply increased by contacting the oil that is filtered by the filtering medium with a product of esterification reaction between a polybasic carboxy acid and a basic amine which amine contains an alcoholiform hydroxyl for esterification reaction with said polybasic carboxy acid and an acyl-oxy group

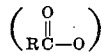

derived from a detergent-forming monobasic carboxy acid having at least 8 carbon atoms and attached to an alkyl radical that in the amine occupies an amino-hydrogen position. The esterification product may be added to the filtering medium in order to increase the dirt removal rate of the filtering medium or may be contacted in some other way with oil passing through the filtering medium. Preferably the ester product is used according to this invention by including it in a filter for use in the lubricating system of an internal combustion engine so as to provide an improved filter having a high dirt removal rate.

Polybasic carboxy acids which may be employed in the esterification reactions include those of the aromatic, alkyl, aralkyl, alicyclic, and heterocyclic types and may be exemplified by phthalic, succinic, malic, fumaric, citric, citroconic, maleic, adipic, tartaric, glutaric, diphenic, naphthalic, oxalic, mesooxalic, pimelic, suberic, azelaic, sebacic, etc. Other suitable polybasic carboxy acids may be prepared by the diene synthesis which involves condensation of alpha, beta unsaturated acids or anhydrides with compounds containing a conjugated double bond. For example, the condensation of maleic anhydride with alpha terpinene yields a dicarboxy acid which is suitable. Other polybasic carboxy acids may be prepared similarly by the diene synthetic reaction involving condensation of an alpha, beta unsaturated monocarboxy acid with a carboxy acid containing a conjugated double bond. For example, crotonic acid may be condensed with abietic acid, which contains a conjugated double bond, to yield a dicarboxy acid suitable for use in the manufacture of ester products adapted for use in increasing the rate of dirt removal from lubricating oils in a filtering operation. When reference is made to polybasic carboxy acids the anhydrides thereof are also included. Modifications which are the functional equivalents such as acyl chloride derivatives, or such as chlor phthalic acid, are also included.

The detergent-forming monobasic carboxy acids which supply the acyl-oxy group of the product which may be used to increase the dirt removal rate of filtering media according to this invention are those acids having at least 8 carbon atoms which have the capacity to react with alkali to form soap or soap-like products and are exemplified by fatty acids containing 8 to 32 carbon atoms such as oleic, linoleic, ricinoleic, stearic, hydroxystearic, palmitic, linolenic, erucic, myristic, etc., and such fatty acids are normally regarded as preferable. The term detergent-forming carboxy acid includes naphthenic acids. Naphthenic acids are derived from various petroleums or are obtained by treatments which involve oxidation of hydrocarbon bodies present in naturally occurring crude oils. The number of carbon atoms in naturally occurring naphthenic acids may vary from 10 carbon atoms to 38 carbon atoms. When a naphthenic acid is employed it is preferred to use naphthenic acids or acid mixtures of the type that are readily available in the open market, e. g. an acid or acid mixture having a molecular weight between about 200 and 575 and a boiling range varying from about 230° C. to about 310° C. Such naphthenic acids are soluble in 65% ethyl alcohol when 10% of naphthenic acid is added but are insoluble when only 5% is added. They also have a low iodine number, e. g. below about 2 or 3 as determined by the Hubl-Waller method. The saponification number preferably should be in the neighborhood of 250. Naphthenic acids of the kind described are readily esterified with glycerine to form naphthenin on intimate admixture and agitation in the presence of dried hydrochloric acid gas using a procedure that is substantially the same as that usually used in the formation of stearin from stearic acid and glycerol. It is known that such naphthenic acids can be treated, for example, with halogens so as to produce derivatives such as chlornaphthenic acids. Also included among the detergent-forming acids are those mono-carboxy acids sometimes called wax acids or paraffin acids, which are formed as a result of oxidation of paraffin or petroleum waxes, particularly those derived from paraffin base petroleums, and which include hydroxylated as well as non-hydroxylated acids. Acids occurring in certain waxes such as carnaubic acid, cerotic acid, lanopalmic acid and lanoceric acid, are considered detergent-forming mono-carboxy acids. Rosin or resinic acids such as abietic acid are likewise included. Such acid materials due to the fact that they react with alkalis to form soap or soap-like products are commonly called detergent-forming acids. They are referred to herein as mono-carboxy acids in order to differentiate them from such materials as are obtained by the sulphonation of naphthenic acids or carboxy abietene. Such mono-basic carboxy detergent-forming acids or suitable derivatives thereof such as esters derived from monohydric, dihydric or trihydric alcohols may be used as will be described below to form products suitable for increasing the dirt removal rate of filtering media. Not only may such carboxy acids and their esters be employed but also suitable derivatives such as acyl chlorides, or anhydrides, and in fact any form is suitable that supplies an acyl-oxy radical of the selected acid.

In addition to common mono-carboxy fatty acids and other detergent-forming mono-carboxy acids, we may also employ fatty acids and partial esters of fatty acids obtained by drastic oxidation of non-drying and semi-drying oils such as castor oil, sunflower seed oil, cotton seed oil, rapeseed oil, soybean oil, and the like. Acids and esters prepared from such blown or drastically oxidized oils are obtainable in the open market. Other detergent-forming acids suitable for employment in the preparation of ester products useful according to this invention may be prepared by blowing or otherwise oxidizing unsaturated fatty acids, such as castor oil fatty acids, soybean fatty acids, oleic acid and the like. Drying oils which have been hydroxylated by oxidation, or similar process, may also be used. The oxidation may be by air, ozone, oxygen, organic peroxides, potassium permanganate, or the like. Other functional equivalents are also regarded as detergent-forming carboxy acids. For example, chlorinated ricinoleic acid or brominated oleic acid may be used instead of ricinoleic acid or oleic acid. Dichlor stearic acid or oleic acid dichloride may be used. Hydrogenated abietic acid may be used instead of abietic acid. It is also possible to condense two moles of ricinoleic acid and produce one mole of monobasic diricinoleic acid. Likewise monobasic triricinoleic acid and monobasic tetraricinoleic acid may be used. Furthermore, the condensation product of a substance such as ricinoleic acid or hydrostearic acid with some non-fatty acid such as lactic acid may be used. It is to be understood that the term detergent-forming mono-carboxy acid radical includes radicals derived from such functional equivalents.

The reaction between a detergent-forming monobasic carboxy acid and a hydroxy alkyl amine to form a suitable intermediate ester amine containing an alcoholiform hydroxyl available for esterification with a polybasic carboxy acid may be illustrated by the reaction between a detergent-forming acid, e. g. a fatty acid, and a simple amine such as diethanol ethyl amine. The fatty acid is indicated as RCOOH containing the conventional acyl-oxy group RCOO, and the reaction may be indicated as follows:

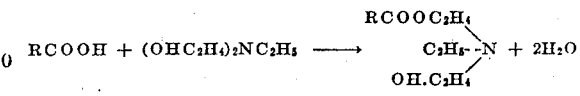

The intermediate amine may be esterified with phthalic anhydride, for example, as follows:

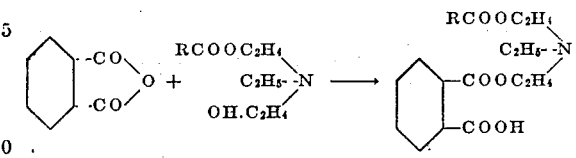

The latter compound is exemplary of one type of esterification product which may be used to increase the dirt removal rate of filtering media in the practice of this invention, and it is to be noted the esterification reaction is between the polybasic carboxy acid and hydroxylated alkyl group in an amino-hydrogen position of an amine which also contains an acyl-oxy group of a detergent-forming monobasic carboxy acid attached to an alkyl radical in an amino-hydrogen position.

Another simple type of compound can be prepared utilizing, for example, ethanol diethyl amine and an hydroxylated fatty acid of the type of OHR'COOH wherein OH.R'COO is an acyl-oxy radical derived from an hydroxylated fatty acid, e. g. ricinoleic acid. The reaction may be indicated as follows:

$$OH.R'COOH+OH.C_2H_4N(C_2H_5)_2 \dashrightarrow$$
$$OH.R'COOC_2H_4N(C_2H_5)_2+H_2O$$

The intermediate amine containing the alcoholiform hydroxyl in the acyl group may be esterified with phthalic acid, for example, as follows:

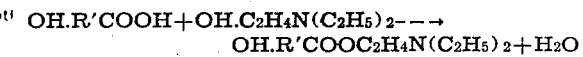

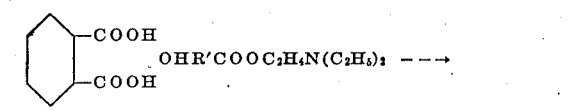

It may be noted that the immediately preceding product is the result of an esterification reaction between the polybasic carboxy acid and an hydroxylated acyl radical that is derived from a detergent-forming monobasic carboxy acid and that is attached to an alkyl radical in an amino-hydrogen position of the amine.

Similarly the reaction may involve an ester of a detergent-forming monobasic carboxy acid, e. g. a glyceride. A triglyceride, may, for example, react with triethanolamine to obtain ester products which, depending upon the molecular ratios involved in the reaction, may be represented as follows:

$$RCOOC_2H_4N(C_2H_4OH)_2$$
$$(RCOOC_2H_4)_2NC_2H_4OH$$

Each of the foregoing intermediate amines contains at least one alcoholiform hydroxyl in a hydroxy alkyl radical available for esterification with a polybasic carboxy acid. If the acyl-oxy radical RCOO is of the hydroxylated OHR'COO type, e. g. when castor oil (triricinolein) is used, the hydroxylated intermediate amine may be in the form $$(OHR'COOC_2H_4)_3N$$

Or utilizing a detergent-forming acid glyceride and diethanol amine, the formation of a suitable intermediate amine may be according to the following reaction—

$$(RCOO)_3C_3H_5 + 3HN(C_2H_4OH)_2 \longrightarrow$$

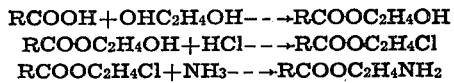     $+ C_3H_5(OH)_3$

Suitable intermediate amines in the nature of primary and secondary amines may likewise be produced in other ways, the following being illustrative.

$$RCOOH + OHC_2H_4OH \longrightarrow RCOOC_2H_4OH$$
$$RCOOC_2H_4OH + HCl \longrightarrow RCOOC_2H_4Cl$$
$$RCOOC_2H_4Cl + NH_3 \longrightarrow RCOOC_2H_4NH_2$$

The glycol $OHC_2H_4OH$ may also be used in the anhydride form $C_2H_4O$. The primary amine $RCOOC_2H_4NH_2$ is in itself suitable provided the acyl-oxy radical RCOO is hydroxylated. If desired, the primary amine can be converted to a secondary alkylol amine by the following reaction.

$$RCOOC_2H_4NH_2 + OHC_2H_4Cl \longrightarrow$$

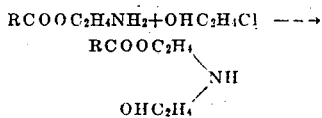

Or the secondary alkylol amine may be produced by the following reaction:

$$RCOOC_2H_4Cl + HHNC_2H_4OH \longrightarrow$$

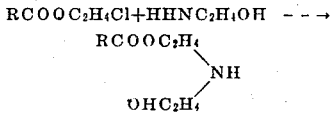

By a similar reaction a suitable secondary alkyl amine can be prepared when the acyl-oxy group is in the form OHR'COO derived from an hydroxylated fatty acid:

$$OHR'COOC_2H_4Cl + HHNC_2H_5 \longrightarrow$$

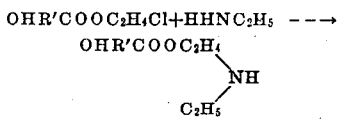

It is also possible to obtain compounds wherein one or two alkylol groups in an amino-hydrogen position are replaced by an alkyl ester group wherein the alkyl radical is acylated by an organic acid having less than 8 carbon atoms provided there is at least one ester alkyl group in an amino-hydrogen position containing an acyl-oxy group derived from a detergent-forming monobasic carboxy acid having at least 8 carbon atoms and provided further that there is an alcoholiform hydroxyl available in the acyl-oxy group derived from the detergent-forming acid or in an alkyl radical in an amino-hydrogen position. For example, an acetylated triethanol amine may be utilized wherein the acetyl radical replaces one hydrogen of one of the hydroxyl ethyl radicals. Upon reaction with a detergent-forming carboxy acid a suitable intermediate amine can be produced having, for example, the formula—

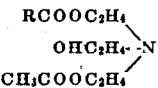

In amine compounds of the character above described it is apparent that the $C_2H_4$ radical which was selected for purposes of exemplification may be replaced by some other divalent aliphatic radical such as $C_3H_6$, $C_4H_8$, $C_5H_{10}$, etc., which may be represented more generally as the radical $C_nH_{2n}$ wherein $n$ denotes some small whole number preferably less than 10. In a similar way the $C_2H_5$ radical may be replaced by other members of the series methyl, ethyl, propyl, butyl, amyl, hexyl, octyl, etc., and may be indicated more generally by $C_nH_{2n+1}$ wherein $n$ has the same significance above mentioned. The compounds above described may, therefore, be represented, for the sake of brevity, by the following formula—

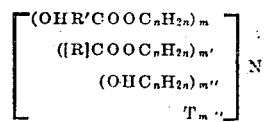

wherein $m$ is 0, 1, 2 or 3; $m'$ is 0, 1 or 2; $m''$ is 0, 1 or 2; $m'''$ is 0, 1 or 2; the values of $m$, $m'$, $m''$ and $m'''$ are subject to the proviso that $m+m''=1, 2$ or $3$ and that $m+m'+m''+m'''=3$: OHR'COO is an acyl-oxy group containing at least 8 carbon atoms derived from an hydroxylated detergent-forming monobasic carboxy acid having at least 8 carbon atoms; [R]COO is an acyl-oxy group containing at least 8 carbon atoms derived from a non-hydroxylated detergent-forming monobasic carboxy acid having at least 8 carbon atoms; T is a hydrogen atom, or $C_nH_{n+1}$, or a group $OHC_nH_{2n}$, or a group $R''COOC_nH_{2n}$ wherein R''COO is an acid radical having less than 8 carbon atoms; and $n$ is a small whole number preferably less than 10.

Whether the radicals above mentioned are in the form $C_nH_{2n}$ or in the form $C_nH_{2n+1}$ they are regarded as being embraced within the term alkyl. Moreover, the alkyl radical instead of being of the type methyl, ethyl, propyl, etc., may be an alicyclic radical such as cyclohexyl, or may be aralkyl such as a benzyl radical. It is also to be understood that alkyl oxy alkyl radicals are included in the term alkyl, the following being illustrative of alkylol amines containing such groups.

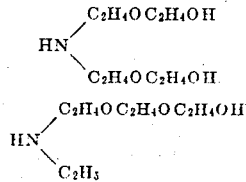

Accordingly, the term alkyl is used in a broad sense as including alphyl, aralkyl, alicyclic, and alkyl oxy alkyl radicals (but not aryl radicals) whether in the monovalent form, e. g. $C_nH_{2n+1}$ or in the divalent form, e. g. $C_nH_{2n}$. Similarly, the term hydroxy alkyl includes hydroxy alicyclic, hydroxy aralkyl, and hydroxy alkyl oxy alkyl as well as simple hydroxy aliphatic radicals. It is to be understood, however, that in hydroxy aralkyl radicals the hydroxyl is attached to the alphyl part and not to the aryl part of the aralkyl radical. If the hydroxyl of an hydroxylated alkyl group is esterified with a low mole hydroxylated carboxy acid, e. g., lactic acid, the resultant hydroxylated group is the functional equivalent of the oxy alkyl groups referred to. It may be further pointed out that a hydroxy alkyl radical may be derived from a glycerol or a polyglycerol, the following being illustrative.

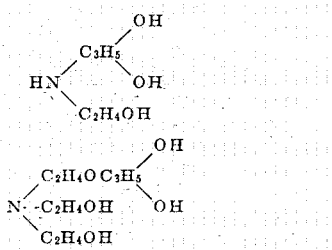

In such cases the radicals C₃H₅OH or C₂H₄OC₃H₅OH are the functional equivalents of the CₙH₂ₙ radical. The OH group in these radicals may, if desired, be replaced by esterification by any suitable carboxyl. Having the foregoing in mind, suitable intermediate amine products may be represented by the following formula.

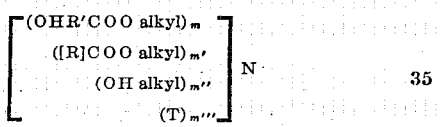

in which m is 0, 1, 2 or 3; m' is 0, 1 or 2; m'' is 0, 1 or 2; m''' is 0, 1 or 2; the values of m, m', m'' and m''' are subject to the proviso that m+m''=1, 2 or 3 and that m+m'+m''+m'''=3; OHR'COO is an acyl-oxy group containing at least 8 carbon atoms derived from an hydroxylated detergent-forming monobasic carboxy acid having at least 8 carbon atoms; [R]COO is an acyl-oxy group containing at least 8 carbon atoms derived from a nonhydroxy detergent-forming monobasic carboxy acid having at least 8 carbon atoms; T is a hydrogen atom or an alkyl radical or an hydroxy alkyl radical or a radical (R''COO alkyl) wherein R''COO is an acid group containing less than 8 carbon atoms derived from an acid having less than 8 carbon atoms.

In referring to the hydroxy alkyl group of a simple alkyl amine suitable for esterification with the carboxyl group of a detergent-forming monobasic carboxy acid to form a more complex intermediate amine, we do not include amines of the type where a hydroxy acyl radical replaces a hydrogen atom of the hydroxyl portion of the hydroxy alkyl radical, unless there is another group in the form of an hydroxy alkyl group wherein the hydroxyl is attached to the alkyl group in the usual way. For instance, if diethyl amino ethanol is treated with lactic acid so as to form lactyl ethanol diethylamine of the following formula—

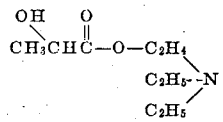

then it is assumed that such material does not contain an hydroxy alkyl group and is not a hydroxy alkyl amine of the character herein referred to. If on the other hand triethanol amine were treated with lactic acid so as to give monolactyl triethanolamine of the following composition—

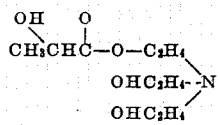

then such compound would be suitable due to presence of one or more hydroxy alkyl radicals.

Suitable amines which may esterify with detergent-forming monobasic carboxy acids may be further exemplified by ethyl ethanol amine, methyl ethanol amine, diethanol ethyl amine, diethyl ethanol amine, triethanol amine, propanol amine, dipropanol amine, propyl propanol amine, tripropanol amine, dicyclohexanol amine, cyclohexyl ethanolamine, cyclohexyl propanol amine, benzylethanolamine, pentanolamine, hexanolamine, octylethanolamine, octadecylethanolamine, cyclohexanolethanolamine, cyclohexanoldiethanolamine, dicyclohexanol ethylamine, benzyl diethanolamine, benzyldipropanol amine, octadecyl diethanolamine, ethyl hexyl ethanolamine, etc.

It may be mentioned that many of the alkylol amines may be looked upon as derivatives of dihydric alcohols, or of the chlorhydrins of dihydric alcohols. For example, the alkylolamines may be formed in the following manner:

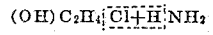

And the C₂H₄ radical may be any one of a number of hydrocarbon radicals which are aliphatic, alicyclic, or aralkyl in nature. It is apparent that similar derivatives are available from glycerols, polyglycerols and the like as indicated by the following reaction:

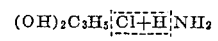

The same type of reactions will produce secondary or tertiary alkylol amines derived from primary and secondary amines such as amylamine, diamylamine, cyclohexyl amine, dicyclohexyl amine, benzylamine, etc. Thus there are a wide variety of hydroxy amines that may be employed to obtain suitable ester products and that may be exemplified by monoglycerylamine, diglyceryl amine, triglyceryl amine, monoglyceryl diethyl amine, monoglyceryl dipropylamine, diglyceryl propylamine, etc.

It should be recognized that the ester compounds contemplated according to the present invention are derived only from basic amines. The word "basic" is employed to exclude amines having little or no basicity such as ordinary aromatic amines or any amine having one or more aryl radicals directly joined to the nitrogen atom. Since the ester amine products are basic they are free from any aryl groups directly attached to the amine nitrogen and are not derived from aryl amines. On the other hand suitable ester products are obtained solely from alkyl amines (simply aliphatic, alicyclic, aralkyl, or alkyl oxy alkyl) having at least one hydroxyl group present. It is true that in aralkyl amines there is an aryl sub-group present, but it is not directly attached to the nitrogen atom as in the case of aryl amines and merely constitutes a substituted alkyl amine. For instance, we consider benzyl amine as being the primary amine, phenmethyl amine. Direct linkage between the amine nitrogen and a carboxylic carbon atom derived from a carboxyl group (e. g.

where RCO is an acyl group and N is an amine nitrogen) also has the effect of rendering the amine non-basic.

It must also be borne in mind that the intermediate amines contemplated herein are still basic in character and exhibit characteristic properties of a basic amine. Thus the amines may combine with various acids to form salts. For example, they may be combined with acetic acid, hydrochloric acid, lactic acid, chloracetic acid, nitric acid, butyric acid, phosphoric acid or any suitable organic or inorganic acid to form salts. They may also combine with water to form a hydrated compound presumably a substituted ammonium compound, but not a quaternary ammonium compound inasmuch as there is always one unsubstituted hydrogen atom of the ammonium radical present. The amines contemplated herein, therefore, include the acid salt form and the hydrated form as well as the simple amine form. Accordingly any amine represented by the formula given hereinabove, namely,

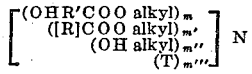

may be in any one of the following forms (the portion in the large bracket being indicated as D for purposes of brevity).

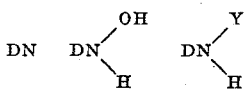

wherein Y represents the acid radical of any acid employed to form a salt.

While the amine may exist in the salt form, attention is called to the fact that the acyl-oxy group derived from the detergent-forming monobasic carboxy acid is attached to an alkyl group in an amino-hydrogen position by an ester linkage. Salts formed by reaction between a detergent-forming monobasic carboxy acid and an amine are not ester products and are unsuitable. For example, a salt forming reaction such as

does not result in an ester product.

The manufacture of intermediate ester amines from tertiary amines is relatively simple because no precautions are necessary to prevent amidification. The selected detergent-forming acid or ester, as for example a fatty acid or fatty acid ester, and the selected hydroxy non-aryl basic amine are mixed in suitable proportions and heated to some point above the boiling point of water, for instance, 110° C., and at a point below the decomposition point of the amine or of the fatty material, for instance, 180° C., for a suitable period of time, e. g. 2 to 8 hours. Mild agitation preferably is employed. A catalyst may be present such as sodium oleate, sodium carbonate, caustic soda, etc., in amounts such as .5% or less. As aforesaid the fatty body or the equivalent may be in the acid form or in the form of an ester, e. g., a glyceride. It is to be noted that the reactions do not take place to appreciable extent if the fatty acid or other detergent-forming acid has previously been converted to a soap or a salt and such soaps or salts are not functional equivalents of ester forming detergent-forming bodies. Intermediate ester amines of the character herein defined when in the form of tertiary amines are regarded as preferable to intermediate ester amines in the form of primary and secondary amines.

When one is employing a hydroxy secondary or primary amine in the estrification reaction, precautions should be taken so that one may obtain substantial quantities of products derived by esterification rather than amidification. This can conveniently be done by utilizing an ester of the detergent-forming acid such as the glyceride of a fatty acid, for example triricinolein. Other examples are ethyl hydroxy stearate, methyl naphthenate, ethylene glycol dinaphthenate, methyl abietate, ethylene glycol diabietate, naphthenin, abietin, etc. A selected glyceride for instance and a selected hydroxy non-aryl basic primary or secondary amine are mixed in suitable proportions and heated at some point above the boiling point of water and below the decomposition point of the amine or glyceride, for instance, between about 110° C. and 180° C., for a suitable period of time such as 4 to 24 hours with mild agitation. A catalyst of the character and amount above referred to may be employed. Since the detergent-forming acid is present in the form of an ester and not in the form of a free acid there is no tendency to form a salt of the detergent-forming acid, and, if the reaction is conducted at the lower range of temperatures there is a decided tendency to form the esterification products rather than the amidification products.

The reactions are carried out under substantially anhydrous conditions inasmuch as the reaction is carried out at temperatures above the boiling point of water and any water that is formed is driven off. The driving off of any water that is formed can be hastened by passing a dried inert gas through the reacting mass and thereby hasten esterification.

The manufacture of suitable intermediate ester amines may be illustrated by the following examples.

*Example I*

Castor oil (triricinolein) is mixed with commercial triethanolamine and the mixture is heated at 150° C. to 180° C. for about 2 hours with mild agitation. Depending upon whether zero, 1 or 2 hydroxy ethyl groups are desired in the intermediate amine, the molecular proportions may be varied, e. g. one mole of castor oil to 1, 2 or 3 moles of triethanol amine. The product may be used as such or may be converted into the acetate by the addition of the maximum amount of glacial acetic acid that can be added without causing acidity to methyl orange indicator.

In the remaining examples the proportions are adjusted so that there is at least one alcoholiform hydroxyl remaining available for subsequent reaction with a polybasic carboxy acid.

*Example II*

Triglycerylamine (trihydroxy propyl amine) may be substituted for triethanolamine in Example I.

*Example III*

Dicyclo hexylamine is reacted with glycerol monochlorhydrin to produce monoglyceryl dicyclohexylamine which is substituted for triethanol amine in Example I.

*Example IV*

Dibenzylamine is reacted with glycerol monochlorhydrin to produce monoglyceryl dibenzylamine which is substituted for triethanol amine in Example I.

*Example V*

An amine represented by the formula

N(C₂H₄OC₂H₄OH)₃ is substituted for triethanol amine in Example I.

*Example VI*

Diamyl monoglycerylamine (1-di-amyl amino propane 2,3 diol) is substituted for triethanol amine in Example I.

*Example VII*

Dipropanol amine is substituted for triethanol amine in Example I.

*Example VIII*

Ethyl hydroxy stearate is substituted for castor oil in Examples I to VII.

*Example IX*

Olive oil is substituted for castor oil in Examples I to VII.

*Example X*

Methyl naphthenate is substituted for castor oil in Examples I to VII.

*Example XI*

Methyl abietate is substituted for castor oil in Examples I to VII.

Having prepared the relatively simple intermediate amines of the character previously described containing an alcoholiform hydroxyl, the intermediate amine is then esterified with a polybasic carboxy acid. The esterification reaction can be caused to take place readily upon the application of heat, the reaction being more rapid the higher the temperature that is employed, but care should be taken not to employ excessively high temperatures which would cause decomposition. The reaction may, if desired, be in the presence of an inert solvent, such as xylene, which may be removed after completion of the reaction, and if water is formed as a product of the reaction the heating may be carried on under a reflux condenser using a water trap to remove water as it is formed. The reaction can also be hastened by passing through the mixture a dried inert gas such as CO₂ or nitrogen. Generally speaking the reaction takes place readily upon heating the material at a temperature above the boiling point of water usually between about 110° and 180° C.

Specific examples may be given for purposes of exemplification as follows:

Castor oil is reacted with triethanol amine as described in Example I given hereinabove to obtain an intermediate amine corresponding to

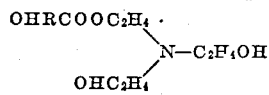

in which OHRCOO represents the ricinoleic radical. One molecular weight of the material is reacted with three molecular weights of phthalic anhydride in a conventional esterification reaction to afford a product which at least in large part may correspond to

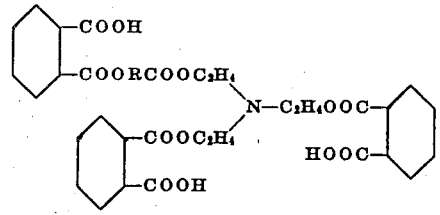

In order to effect the esterification reaction the materials are intimately mixed and heated to approximately 120°–160° C. with constant agitation until samples taken from the batch and analyzed show substantially complete disappearance of the hydroxyl value and substantially no free phthalic anhydride. In the event that the hydroxyl value disappears and phthalic anhydride is still present, the relative amount of phthalic anhydride should be decreased to 2¼ to 2½ moles or thereabouts. A suitable solvent such as xylene may be present and any water formed may be dispelled off continuously during the esterification process. The solvent may be removed or may be permitted to remain in the product. If desired, the acidic mass may be neutralized by an alkali, by an amine, etc., as will be described more in detail below.

If desired other intermediate amines such as those described above in Examples I to XI may be used.

By way of further exemplification butyl acid phthalate or potassium acid phthalate may be employed instead of phthalic anhydride in the foregoing example. Also a polybasic carboxy acid such as maleic anhydride or citric acid may be used.

By way of still further exemplification, the procedure above described may be followed without, however, utilizing a solvent and when the reaction is complete one to two moles or slightly less of glycerol are added and esterification continued until all the glycerol present is chemically combined. Instead of glycerol other similar materials may be used such as ethylene glycol, diethylene glycol, monoethyl-ether derivative of ethylene glycol, octyl alcohol, or oleyl alcohol.

In carrying the foregoing reaction out it is to be noted that the reaction involves esterification. The intermediate amines being basic may form salts to some extent with the polybasic carboxy acid. Reaction with a polybasic carboxy acid such as phthalic acid to form a salt with an amine may be indicated briefly as follows:

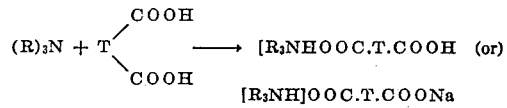

The materials suitable for increasing dirt removal rate of filtering media in the practice of this invention are not products of salt formation but are products of esterification reaction. There is no objection to salt formation, however, provided that esterification also takes place. It may also be pointed out that the esterification products of the present invention do not involve an amide linkage involving replacement of an amino-hydrogen by an acyl radical constituting part of the polybasic carboxy acid residue. It has already been pointed out that there is no amidification reaction involving the detergent-forming monobasic carboxy acid residue.

As mentioned above the ester amine products may occur in salt form by combining with some acid such as acetic acid or hydrochloric acid, or in some instances with acids such as oleic acid or naphthenic acid. The ester amine product may also occur in hydrated form by combination with water.

The ester product produced by reaction between polybasic carboxy acid and an amine of the character above described containing an alcoholiform hydroxyl may contain one or more free carboxyl groups or the acid hydrogen may be replaced by any other cation or hydrogen equivalent that has a univalent linkage with the carboxyl residue. Thus the acid hydrogen may be replaced by esterification with a mono-hydric alcohol such as methyl, ethyl, propyl, butyl, amyl, and hexyl alcohols and the like. It is preferred, however, to neutralize the acid hydrogen with an oxyalkyl radical containing an alkylene oxide group, e. g. by reaction with an alcohol that has been treated with an alkylene oxide such as ethylene oxide so that the carbon atoms of the oxy alkyl group are interrupted by one or more oxygen atoms. The acid hydrogen may also be replaced by reaction with a polyhydric alcohol which may be aliphatic, aromatic, aralkyl, cyclic, heterocyclic, etc., such as ethyleneglycol, glycerol, erythriol, adonitol, mannitol, mannitan, sorbitan, etc. The acid hydrogen may also be replaced by ammonia or by a metal and such compounds are referred to as salts. Monovalent metals such as sodium, potassium, etc., are included and likewise polyvalent metals such as calcium, iron, magnesium, etc., which may, for example, replace the acid hydrogen of a plurality of free carboxyl groups in the same or different ester molecules and thereby become linked with the individual carboxyl residues by a univalent linkage and act as a hydrogen ion equivalent. The acid hydrogen may also be replaced by reaction with an amine, e. g. amyl amine, diamylamine, benzyl amine, cyclohexyl amine, etc., or by reaction with an amido-alcohol such as mono-, di- or tri-ethanol amine, mono-, di- or tri-propanol amine, aminomethyl propane diol, etc., involving the alcoholic hydroxyl or simple neutralization. When reference is made to an ester product containing a free carboxyl group it is intended that the product contain a COOH group in which the acid hydrogen has not been replaced. When reference is made to a carboxylic group, the group may be in the acid form in which the acid hydrogen has not been replaced or may comprise some other atom or group replacing the acid hydrogen as a hydrogen ion equivalent. The ester reaction is regarded as involving a polybasic carboxy acid whether the acid hydrogen of one or more of the carboxyl groups is replaced by a cation before or after the esterification reaction.

In the event that the ester product happens to contain a free hydroxyl either as part of the acyl radical or other organic group, the hydroxyl may be subjected to various reactions, e. g. in known ways such as acylation with monobasic or polybasic carboxy acids, and the like. Similarly, if the detergent-forming carboxy acid is derived from an unsaturated acid, e. g. oleic acid or the like, it may be subjected to the usual reactions involving the ethylene linkage, such as halogenation. A chlor alkyl radical is regarded as the equivalent of an alkyl radical.

Inasmuch as the intermediate amines with which the polybasic carboxy acid material reacts may contain a plurality of hydroxyl groups, it is apparent that the esterification reaction may take place in various molecular ratios. It is also apparent that the molecular weight of the product may vary widely. The molecular weight of the ester product as determined by cryoscopic methods or from obvious composition of the ester, usually runs between about 300 and about 3000 and is seldom over about 5000. Ester products having a molecular weight over about 10,000 preferably are not employed.

During the esterification reaction there may be some polymerization, especially if the conditions of esterification are prolonged. It is to be understood that reference to ester products produced by esterification includes possible polymerized forms as well as simple esters or monomers.

Some of the ester products above defined are somewhat soluble in oil while others are substantially insoluble. If the ester product is such that only one part or less is soluble (as determined by usual visual methods) in ordinary straight-run kerosene from Pennsylvania crude, the product is to be regarded as substantially insoluble in oil. For use in increasing the dirt removal rate of filtering media according to this invention it is preferable that the ester product be substantially insoluble in oil. Most of the ester products hereinabove described are sub-resinous in character and of a tarry or balsam-like consistency. In the case of some of the interacting materials, particularly in the case of polyhydroxylated amines which react with polycarboxy acids, it is possible by prolonged heating at relatively high temperature to obtain a product that is of a hard horny character and lacks appreciable solubility in oil and in the lower aliphatic alcohols. Care should be taken not to produce such hard and totally oil insoluble bodies. It may be mentioned, however, that even if a trace of solubility such as a few parts dissolving in a hundred thousand parts of kerosene of the character above mentioned affords satisfactory product for increasing the dirt removal rate of filtering media in the practice of this invention.

The production of preferred ester products which are substantially oil insoluble or of low oil solubility can be achieved having in mind the following factors which influence the oil solubility of the ester product. Thus oil solubility is decreased when the polybasic carboxy acid employed in the esterification reaction has a minimum number of carbon atoms. For example, a product made using citric or maleic acid will have less oil solubility than a product derived by reaction with phthalic acid or naphthalic acid. Oil solubility is likewise affected by the nature of any substituent for the acid hydrogen of a residual carboxyl group of the polybasic carboxy acid that may be present. If the acid hydrogen is permitted to remain as it is or is replaced by a metal or ammonia the ester product in such acid or salt form will have less oil solubility than if the acid hydrogen were replaced by reaction with a monohydric alcohol or a high molalamine, and ester products containing a free carboxyl group or a carboxylic group in the form of a salt are preferred for use in the practice of this invention. If the acid hydrogen of a free carboxyl group is replaced by reaction with a polyhydric alcohol such as glycerol, or with an amino-alcohol such as triethanol amine, so that the group replacing the acid hydrogen is an hydroxylated organic group, oil solubility is decreased and such substances are preferred. Moreover, when the acid hydrogen is replaced by a radical containing an alkylene oxide group, e. g. by reaction with an ether alcohol, oil solubility is decreased and such substances are among substances that are preferred in the practice of this invention. Oil solubility can also be decreased by decreasing the number of carbon atoms in the aryl radical that is derived from a detergent-forming carboxy acid. It is also preferable that the ester product contain in addition to the acyl-oxy group derived from a detergent-forming acid and connected to the amino-nitrogen through an alkyl group, an oxy alkyl group in an amino-hydrogen position such as $C_2H_4OH$, $C_2H_4OC_2H_4OH$, $C_2H_4OOCR'$, $C_3H_5(OH)_2$ and $C_2H_4OOCC_2H_4OH$, in order to decrease oil solubility. Or more generally it is preferable that the amine contain one or more oxy hydrocarbon groups in addition to the acyl groups of the detergent-forming acid and of the polybasic carboxy acid. While there are other factors affecting oil solubility the foregoing discussion is believed to be adequate to enable one to obtain ester products having desired properties of oil solubility. While it is preferable to employ ester products which are substantially insoluble in oil as defined above, those ester products which are more soluble in oil likewise may be employed.

The ester products hereinabove described may be more or less soluble in water but water solubility is not of particular importance because water in more than small amounts does not occur in the oil which is used in the lubricating system of an internal combustion engine and which is clarified by the use of a filter.

The ester products produced as above described which are suitable for increasing the dirt removal rate of filtering media are soluble in one or more of such solvents as lower aliphatic alcohols (ethyl to octyl) carbon tetrachloride, xylene, etc. Advantage of this property may be taken in order to facilitate application of the product to filters and filtering media.

The esterification product above described when used in conjunction with a filter in a filtering operation sharply increases the dirt removal rate of the filter. The product may be used in a number of different ways. Thus, in a paper type filter the product, either by itself or mixed with a solvent such as alcohol, preferably is applied to the surface of the paper covering all or a portion of the total paper surface exposed to oil. Cloth filters may be similarly treated. Cotton linters filters preferably are treated by adding the product either diluted or undiluted to cotton linters either on the surface or throughout the body thereof. Other filtering mediums sufficiently porous to permit oil to flow therethrough but sufficiently compact to filter out solid particles may be similarly treated. The product is also effective when incorporated in filters or filter mediums in other ways than those above mentioned. Moreover, whenever the product is permitted to contact oil that passes through the filtering medium it is effective to increase the rate of dirt removal by the filtering medium. Thus, if the product is applied to a screen or the like through or past which the oil passes before reaching the filtering medium, the dirt removal rate of the medium is increased. If the product is merely introduced into the casing within which the filtering medium is contained, it is effective.

The amount of the product that is used depends upon the increase in dirt removal rate that is desired. Ordinarily, for commercial purposes, a small amount, such as about 2 to 25 grams, is all that is desirable for use in connection with a filter of proper size for the average automobile. Use of as little as 4 grams gives a very pronounced increase in dirt removal rate and the dirt removal rate is only slightly increased by using 5 or 6 times this amount.

As above mentioned, the use of an additive of the type above defined sharply increases the dirt removal rate. In other words, when a filtering operation is carried on using these additives in connection with a filter, a single filter can remove dirt as fast as the dirt could be removed by the use of a plurality of untreated filters. In thus increasing the dirt removal rate, the improved result is secured chiefly through a greater removal of solids in a single passage through the filtering medium.

The improvements in the rate of dirt removal from lubrication oil that may be effected by the additives herein defined, have been tested by the following procedure. From a heated tank containing six quarts of oil, oil was withdrawn by a pump and forced continuously at 45 pounds per square inch pressure into a standard type automobile filter and the filtered oil was returned to the tank. Starting with clean oil, 5 grams of solids of the type formed in automobiles were added to the oil in the tank in such manner as to be thoroughly distributed throughout the oil in the tank, and observation was made of this oil to determine the number of minutes required to clean it to .02% solid content after each addition of the dirt. At two-hour intervals, additional 5-gram dirt charges were added and observations made of the length of time required to clean the oil in the tank to .02% solids after each dirt addition. Comparative tests were run with two sets of similar filters, the filters of one set being treated with the additive and the filters of the other set not being so treated. After each filter had reached the condition where oil in the tank contained .1% solids two hours after the dirt was added, the amount of dirt in the filter was determined by subtracting the amount of dirt remaining in the tank from the amount of dirt added during the test. The results for each set of filters were averaged. Using ester products above described, it was found that the treated filter cleaned up the first addition of dirt much more rapidly than the untreated filter, and with subsequent dirt additions, the advantage in favor of the treated filter persisted. The life of the treated filter was not materially greater than that of the untreated filter.

According to this invention, additives that sharply increase the dirt removal rate of filtering media are made available which retain their effectiveness for the full life of the filter, withstand the temperatures encountered in internal combustion engine lubrication without volatilization, remain absorbed or deposited on the filtering medium during its use, and impart no injurious effects to the oil being filtered. The additive may be used without requiring any material change in the manufacture of the filter. Because of the faster dirt removal rate resulting from the use of the additive, the treated filter reduces the accumulation of solid particles and abrasive matter in the lubricant materially below that obtainable by a similar filter that has not been treated and thereby enhances the efficacy of the lubricant.

While this invention has been described in connection with a number of examples of products suitable for use in increasing the dirt removal rate of filtering media according to this invention, it is to be understood that this has been done merely for the purpose of illustration and exemplification and that the scope of this invention is to be governed by the language of the following claims considered in the light of the foregoing description.

We claim:

1. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising an ester amine that is a product of esterification reaction between a polybasic carboxy acid and a basic amine which amine contains an alcoholiform hydroxyl for esterification reaction with the polybasic carboxy acid and an acyl-oxy group containing at least 8 carbon atoms derived from a detergent-forming monobasic carboxy acid having at least 8 carbon atoms and attached to an alkyl radical that in the amine occupies an amino-hydrogen position.

2. A filter according to claim 1 wherein said acyl-oxy group is derived from a fatty acid having 8 to 32 carbon atoms.

3. A filter according to claim 1 wherein said ester amine contains a carboxylic radical selected from acid and salt carboxylic radicals.

4. A filter according to claim 1 wherein said ester amine contains a free carboxyl group.

5. A filter according to claim 1 wherein said ester amine contains an oxy hydrocarbon group in addition to the acyl and carboxylic groups.

6. A filter according to claim 1 wherein said ester amine is a tertiary amine.

7. A filter according to claim 1 wherein said ester amine is substantially insoluble in oil.

8. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising an ester amine that is a product of esterification reaction between a polybasic carboxy acid and an hydroxylated acyl radical containing at least 8 carbon atoms derived from a detergent-forming monobasic carboxy acid having at least 8 carbon atoms and attached to an alkyl radical that is in an amino-hydrogen position of a basic amine.

9. A filter according to claim 8 wherein said hydroxylated acyl radical is derived from an hydroxylated fatty acid having 8 to 32 carbon atoms.

10. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising an ester amine that is a product of esterification reaction between a polybasic carboxy acid and an hydroxylated alkyl radical that is in an amino-hydrogen position of a basic amine, which amine contains an acyl-oxy group containing at least 8 carbon atoms derived from a detergent-forming monobasic carboxy acid having at least 8 carbon atoms and attached to an alkyl radical that in the amine occupies an amino-hydrogen position.

11. A filter according to claim 10 wherein said acyl-oxy group is derived from a fatty acid having 8 to 32 carbon atoms.

12. A filter for use in connection with the lubricating system of an internal combustion engine, said filter comprising a casing containing a filtering medium which is sufficiently porous to permit oil to flow therethrough but sufficiently compact to filter out solid particles, and said filter comprising for contact with oil passing therethrough an agent for increasing the dirt removal rate of said filtering medium, said agent comprising a product derivable by esterification reaction between: first, a polybasic carboxy acid; and second, an amine represented by the formula,

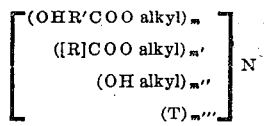

in which $m$ is 0, 1, 2 or 3; $m'$ is 0, 1 or 2; $m''$ is 0, 1 or 2; $m'''$ is 0, 1 or 2; the values of $m$, $m'$, $m''$, and $m'''$ are subject to the proviso that $m+m''=1, 2$ or $3$ and that $m+m'+m''+m'''=3$; OHR'COO is an acyl-oxy group containing at least 8 carbon atoms derived from an hydroxylated detergent-forming monobasic carboxy acid having at least 8 carbon atoms; [R]COO is an acyl-oxy group containing at least 8 carbon atoms derived from a non-hydroxy detergent-forming monobasic carboxy acid having at least 8 carbon atoms; T is a hydrogen atom or an alkyl radical or an hydroxy alkyl radical or a radical (R''COO alkyl) wherein R''COO is an acid group containing less than 8 carbon atoms derived from an acid having less than 8 carbon atoms.

13. A filter for use in connection with the lubricating system of an internal combustion engine comprising a casing containing a filtering medium sufficiently porous to permit oil to flow therethrough but sufficiently compact to filter out solid particles, said medium having applied thereto an agent to increase the dirt removal rate of said filtering medium, said agent comprising an ester amine that is a product of esterification reaction between a polybasic carboxy acid and a basic amine which amine contains an alcoholiform hydroxyl for esterification reaction with the polybasic carboxy acid and an acyl-oxy group containing at least 8 carbon atoms derived from a detergent-forming monobasic carboxy acid having at least 8 carbon atoms and attached to an alkyl radical that in the amine occupies an amino-hydrogen position.

14. A method of increasing the dirt removal rate of a filtering medium for removing dirt from the lubricating oil of an internal combustion engine, said method comprising contacting oil that is filtered by said filtering medium with an ester amine that is a product of esterification reaction between a polybasic carboxy acid and a basic amine which amine contains an alcoholiform hydroxyl for esterification reaction with the polybasic carboxy acid and an acyl-oxy group containing at least 8 carbon atoms derived from a detergent-forming monobasic carboxy acid having at least 8 carbon atoms and attached to an alkyl radical that in the amine occupies an amino-hydrogen position.

15. A method according to claim 14 wherein said acyl-oxy group is derived from a fatty acid having 8 to 32 carbon atoms.

16. A method according to claim 14 wherein said ester amine contains a carboxylic radical selected from acid and salt carboxylic radicals.

17. A method according to claim 14 wherein said ester amine contains a free carboxyl group.

18. A method according to claim 14 wherein said ester amine contains an oxy hydrocarbon group in addition to the acyl and carboxylic groups.

19. A method according to claim 14 wherein said ester amine is a tertiary amine.

20. A method according to claim 14 wherein said ester amine is substantially insoluble in oil.

21. A method of increasing the dirt removal rate of a filtering medium for removing dirt from the lubricating oil of an internal combustion engine, said method comprising contacting oil that is filtered by said filtering medium with a product derivable by esterification reaction between: first, a polybasic carboxy acid; and second, an amine represented by the formula,

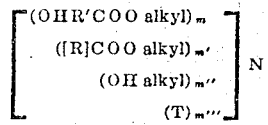

in which $m$ is 0, 1, 2, or 3; $m'$ is 0, 1 or 2; $m''$ is 0, 1 or 2; $m'''$ is 0, 1 or 2; the values of $m$, $m'$, $m''$ and $m'''$ are subject to the proviso that $m+m''=1$, 2 or 3 and that $m+m'+m''+m'''=3$; OHR'COO is an acyl-oxy group containing at least 8 carbon atoms derived from an hydroxylated detergent-forming monobasic carboxy acid having at least 8 carbon atoms; [R]COO is an acyl-oxy group containing at least 8 carbon atoms derived from a non-hydroxy detergent-forming monobasic carboxy acid having at least 8 carbon atoms; T is a hydrogen atom or an alkyl radical or an hydroxy alkyl radical or a radical (R''COO alkyl) wherein R''COO is an acid group containing less than 8 carbon atoms derived from an acid having less than 8 carbon atoms.

DONALD H. WELLS.
MELVIN DE GROOTE.

CERTIFICATE OF CORRECTION.

Patent No. 2,343,436.    March 7, 1944.

DONALD H. WELLS, ET AL.

It is hereby certified that error appears in the printed specification of the above numbered patent requiring correction as follows: Page 7, first column, line 44, for "amido-alcohol" read --amino-alcohol--; and that the said Letters Patent should be read with this correction therein that the same may conform to the record of the case in the Patent Office.

Signed and sealed this 9th day of May, A. D. 1944.

Leslie Frazer (Seal)    Acting Commissioner of Patents.

CERTIFICATE OF CORRECTION.

Patent No. 2,343,436.                      March 7, 1944.

DONALD H. WELLS, ET AL.

It is hereby certified that error appears in the printed specification of the above numbered patent requiring correction as follows: Page 7, first column, line 44, for "amido-alcohol" read --amino-alcohol--; and that the said Letters Patent should be read with this correction therein that the same may conform to the record of the case in the Patent Office.

Signed and sealed this 9th day of May, A. D. 1944.

Leslie Frazer

(Seal)                            Acting Commissioner of Patents.